United States Patent
Sinsley

[19]

[11] Patent Number: 6,077,467
[45] Date of Patent: Jun. 20, 2000

[54] ARTIFICIAL FIBER LOG PROCESS

[76] Inventor: Wayne Sinsley, 4255 Depot Rd., Salem, Ohio 44460

[21] Appl. No.: 09/412,165

[22] Filed: Oct. 5, 1999

[51] Int. Cl.[7] .................................................... B29B 1/26
[52] U.S. Cl. ............................... 264/87; 264/86; 264/255
[58] Field of Search ............................... 264/86, 87, 220, 264/255, 256

[56] References Cited

U.S. PATENT DOCUMENTS

| | | | |
|---|---|---|---|
| 4,840,763 | 6/1989 | Feitag | 264/87 |
| 4,877,417 | 10/1989 | Crace . | |
| 5,026,579 | 6/1991 | Thow . | |
| 5,069,200 | 12/1991 | Thow et al. . | |
| 5,271,888 | 12/1993 | Sinsley . | |
| 5,284,686 | 2/1994 | Thow . | |
| 5,612,266 | 3/1997 | Delvaux et al. . | |
| 5,688,568 | 11/1997 | Wolf et al. . | |
| 5,700,409 | 12/1997 | Corry | 264/87 |
| 5,800,875 | 9/1998 | Hussong | 264/220 |
| 6,004,493 | 12/1999 | Hussong | 264/87 |

Primary Examiner—James Derrington
Attorney, Agent, or Firm—Harpman & Harpman

[57] ABSTRACT

A process for making an artificial mineral or ceramic fiber log representation having areas of enhanced thermal texturing that can be used in gas fireplaces to simulate the burning of real wood logs. The process uses a screen mold having simulated wood pattern elements to impart a realistic exterior surface to the artificial log and thermal reactive textured surface areas applied to said screen mold. A slurry of mineral fibers is injected under pressure into the mold forcing excess water therethrough leaving the fibers impinged within the mold. The log thus formed is dried in an oven and processed for additional decorative coatings.

19 Claims, 4 Drawing Sheets

ARTIFICIAL FIBER LOG PROCESS

BACKGROUND OF THE INVENTION

1. Technical Field

This invention is directed to a process of manufacturing artificial logs for use in gas equipped fireplaces to give the impression of real burning logs.

2. Description of Prior Art

Prior art processes for artificial log manufacturing typically use a screen mold with textured surface elements on the screen that is form fitted into an apertured support mold cavity into which a slurry of mineral or ceramic fibers is deposited. A vacuum is then applied to the mold drawing the liquid therefrom, leaving the mineral fibers collected on the screen surface. The log is removed from the mold and dried in an oven to eliminate the remaining moisture present after molding of approximately 50%. After an extended drying time in the oven the log is removed and color coded for realism and then redried ready for use. See for example U.S. Pat. Nos. 4,877,417, 5,271,888, 5,284,686, 5,612,266, 5,700,409 and 5,800,875.

In U.S. Pat. No. 4,877,417, an artificial fireplace log is disclosed which is partially combustible having a clay carrier and consumable wood fiber portions.

U.S. Pat. No. 5,271,888 is directed towards a ceramic log molding process for forming lightweight synthetic ceramic logs having a flexible porous pattern screen using a vacuum source for withdrawing water from the mold slurry forming a log representation within the mold.

A combustible artificial log is disclosed in U.S. Pat. No. 5,284,686 having a composite log formed of ceramic concrete with ceramic fiber sections.

U.S. Pat. No. 5,612,266 shows a decorative non-combustible synthetic fire log formed my mineral foam in a mold shape as a nature wood log. The mineral foam composition is claimed.

U.S. Pat. No. 5,700,409 discloses a method of molding an article in which a flexible mold having an article forming cavity is affixed to a suction chamber so as to release their article within the mold after the molding process.

Mineral fiber log processing is disclosed in U.S. Pat. No. 5,800,895 wherein a screen mold is used to impart an exterior log surface. A slurry containing mineral wool fibers is drawn into the mold by a vacuum leaving the mineral fibers within the mold.

Alternate prior art patents have been directed to improvements to artificial logs with enhanced glowing properties by having inserts of refractory and ceramic fibers that have a higher thermal conductivity component compared to the surrounding materials. When heated, these areas will glow at a lower temperature thus imparting a naturalistic feature to the log, see for example U.S. Pat. Nos. 4,877,417, 5,026,579, 5,069,200, 5,284,886 and 5,688,568.

In U.S. Pat. No. 4,877,417 an artificial fireplace log is disclosed having a clay carcass and a combustible wood fiber material outer layer.

U.S. Pat. No. 5,025,579 is directed to a composite artificial log where the log is formed from a ceramic concrete upper section and a ceramic fiber lower section having a lower thermal conductivity.

U.S. Pat. No. 5,069,200 discloses a gas fired artificial log assembly having the logs stacked with contoured gas burners positioned within. Portions of the logs are made of ceramic fiber inserts that react to heat impingement.

U.S. Pat. No. 5,284,686 claims ceramic concrete logs with ceramic fiber sections that act as inserts for enhanced visual appearance.

U.S. Pat. No. 5,688,568 defines a ceramic fire log process wherein a portion of the pre-formed log's surface is loosened to provide a texture and less dense area resulting in a more naturalistic log. The loosening of the fibers is achieved by manual stimulation or abrasion.

SUMMARY OF THE INVENTION

An improved process for molding synthetic fiber logs used in gas fireplaces to simulate burning wood logs. The process imparts areas of increased thermal transmission by use of a textured screen with a mold body into which a initial paste of texturing synthetic mineral wood mixture is selectively deposited on portions of the screen. The the slurry of synthetic mineral wool fiber is injected under pressure and then molded under increased air pressure by driving the liquid out of the mold through a plurality of apertures. Once molded, continued air pressure partially dries the formed article to low moisture content in a shortened cycle time. The molded log has areas of increased texturing and heat absorption properties.

DESCRIPTION OF THE PREFERRED EMBODIMENT

Figure 1:
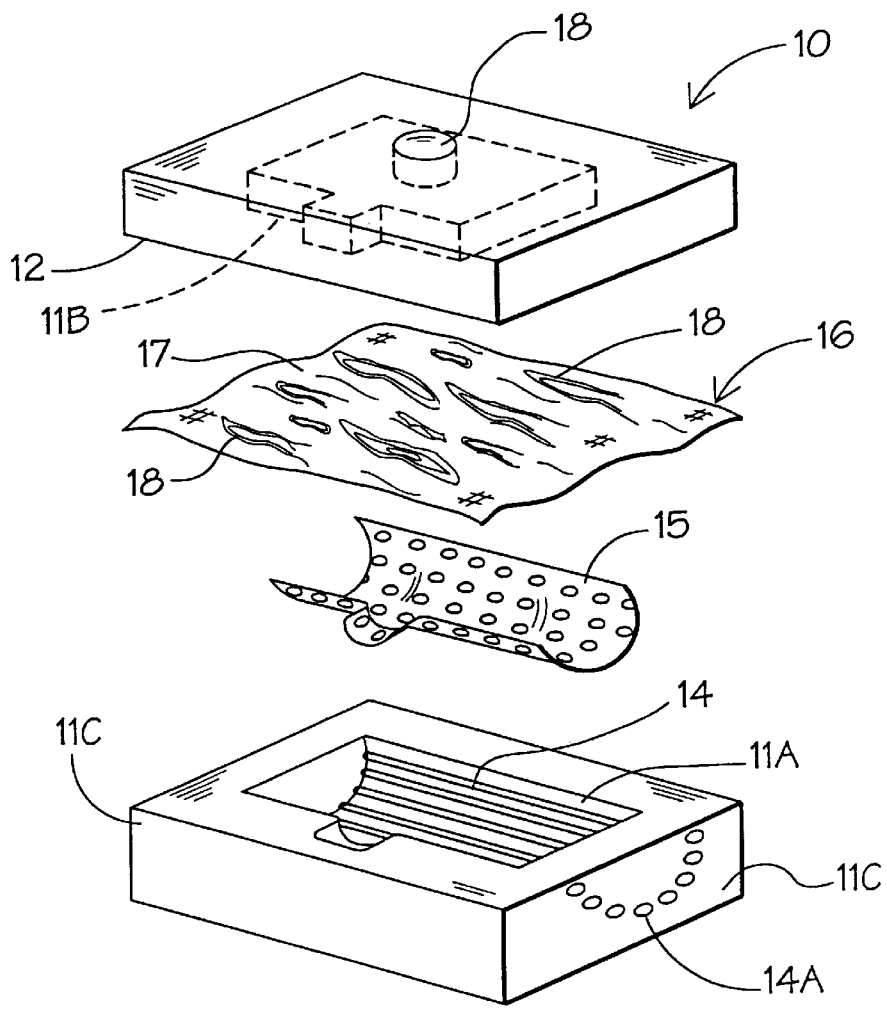
FIG. 1 is an exploded perspective view of an open mold with fixed mesh lining and separable flexible porous screen to be positioned within the mold.
Figure 2:
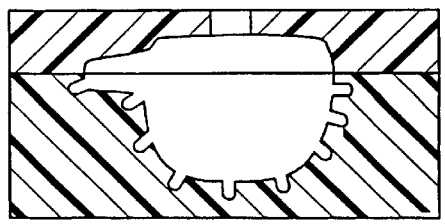
FIG. 2 is a cross-sectional view of the closed mold illustrating a slurry inlet opening and plurality of grooves elongated longitudinally aligned grooves for liquid removal.
Figure 3:
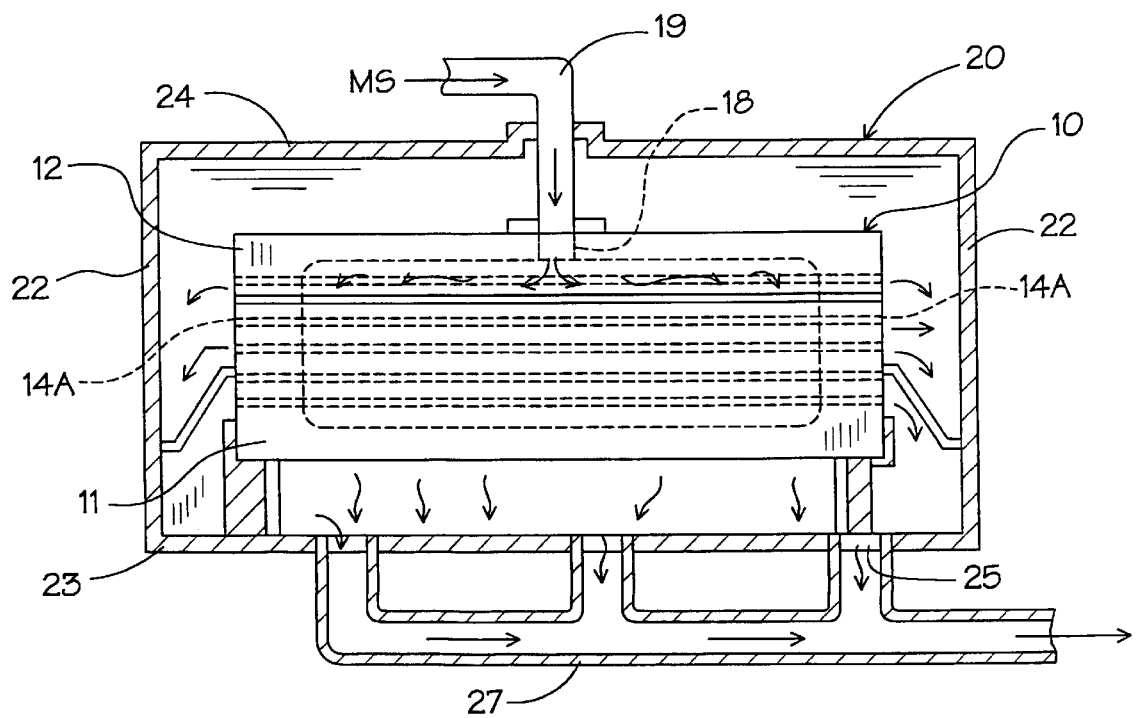
FIG. 3 is a partial cross-sectional view of a mold within a mold station capture enclosure illustrating slurry inlet and liquid outlet portals in the mold base.

In the present improved process for molding synthetic logs for use in gas fireplace environments, a first step is illustrated in FIGS. 1–3 of the drawings wherein a two-piece mold assembly 10 can be seen having a base body member 11 and a removable top portion 12. Both the base body member 11 and removable top portion 12 have hollowed out interior surfaces 11A and 11B respectively for the formation of a log shaped cavity therebetween. The base and top members 11 & 12 have a plurality of elongated aligned surface grooves 14 connecting the interior surface 11A to its exterior surface 11C through outlet apertures 14A. A non-corrosive metal mesh 15 is contoured within the inner surface 11A of the base body member 11 and acts as a first channel diffuser of liquid in the process.

It will be evident from the above description that the base and top body members 11 and 12 respectively are removably secured by conventional molding processes together as will be well understood by those skilled within the art. The base and top body members 11 and 12 are typically made from castable synthetic compound as is illustrated in this example.

A flexible metallic mesh 16 preferably with a 46% open porosity rate is used as the actual molding surface 17 and has a realistic texture imparted thereon by the employment of synthetic appliques 17A bonded thereto for imprinting the natural look surface to the molded article. Typically, these appliques are applied to represent realistic exterior surface of naturally occurring logs thus imitating a bark consistency with various textures employed therein.

The assembled mold 10 has an inlet opening at 18 in the top body member for registration of an injection pipe 19, best seen in FIG. 3 of the drawings. The entire mold assembly 10 is mounted within a retainment enclosure 20 defining a mold station 21. The retainment enclosure 20 defines a liquid containment and collection structure having multiple upstanding sidewalls 22 with an integral base 23 and access lid 24 hingeably secured thereto so that an operator (not shown) can readily open and access the mold assembly 10 within for removal of the molded article after the molding process. The retainment enclosure's integral base 23 has a plurality of drain openings 25 communicating with a return pipe 27 for liquid associated with the molding process.

Figure 4:
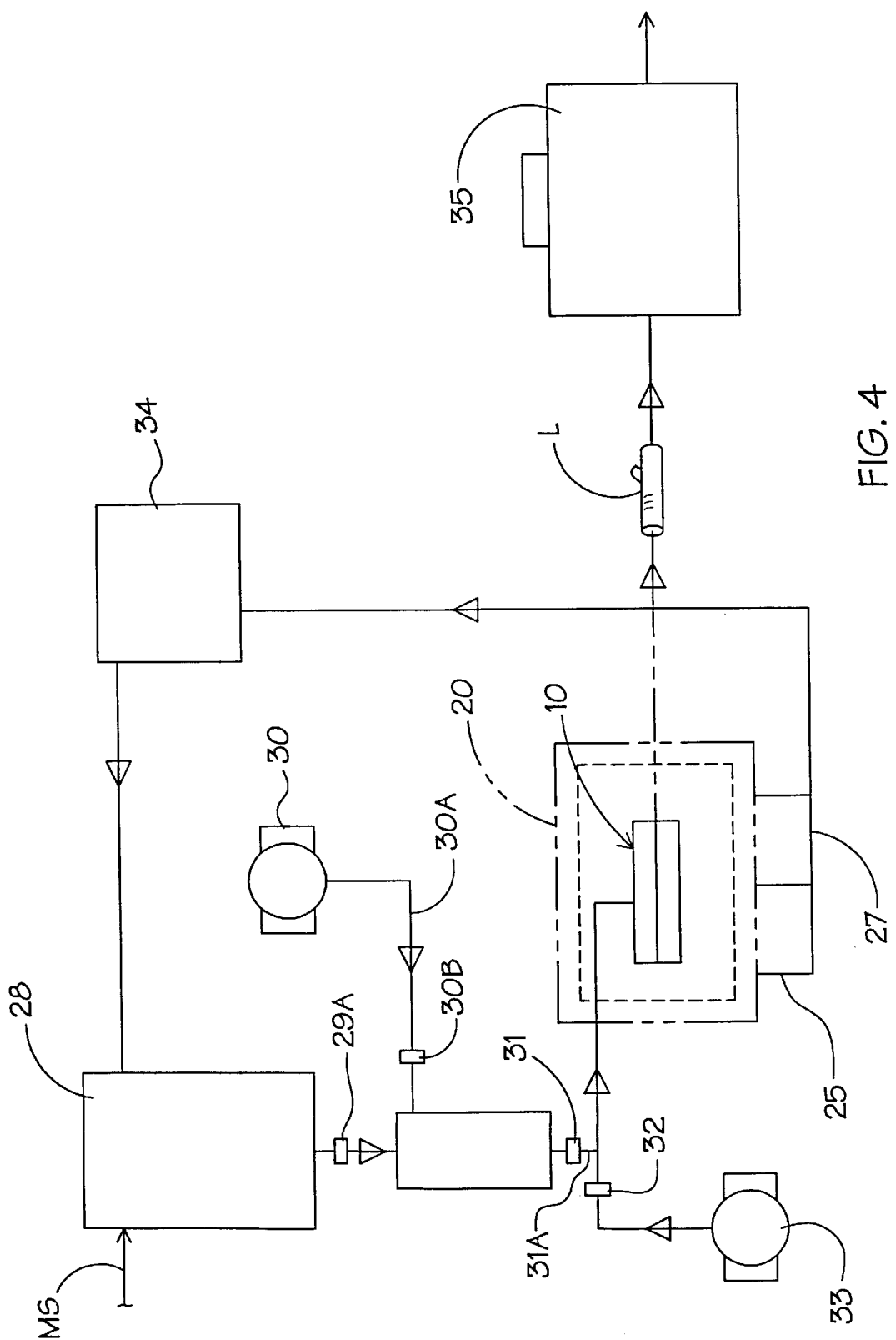
FIG. 4 is a block diagram of the required components of the pressure injection drawing process of the invention.

Referring now to FIG. 4 of the drawings, a systematic sequence steps can be seen wherein a storage and supply batch tank 28 is filled with a well known mold slurry formulation MS comprising; water, ceramic fiber, starch, and colloidal cilica/sol components. Such slurry formulations are typically set forth in the following batch ratios by weight; water 2,075 lb., ceramic fiber 30 lb., colloidal cilica/sol 3.125 lb. and chromite 1.50 lb. and starch 1.375 lb.

The ceramic fiber is manufactured by a number of companies, an example of same is brand name Fiber Frax, produced by the Carboriadue Company. The fibers are non-combustible with a stable reactivity and are made from alumina and silica and maintains their properties up to a temperature gradient of 2,300 Farenheit.

The coloidal silica/sol has a positive charge for imparting adherence to themselves.

The chromite compound is generally made up of an iron chromite ore with a 3,800 degree Farenheit in this example chosen for illustration. The starch component preferably comprises a starch material made by Chemstar Products Company under the brand name Glucopus having a negative charge and is used to enhance the handling properties of the composition and formed log.

The hereinbefore described disclosed fiber slurry is discharged into a batch injection tank 29 by gravity flow through valve means 29A. The batch injection tank 29 is pressurized by a source of air pressure 30 by a supply line 30A and valving means 30B.

Figure 6:
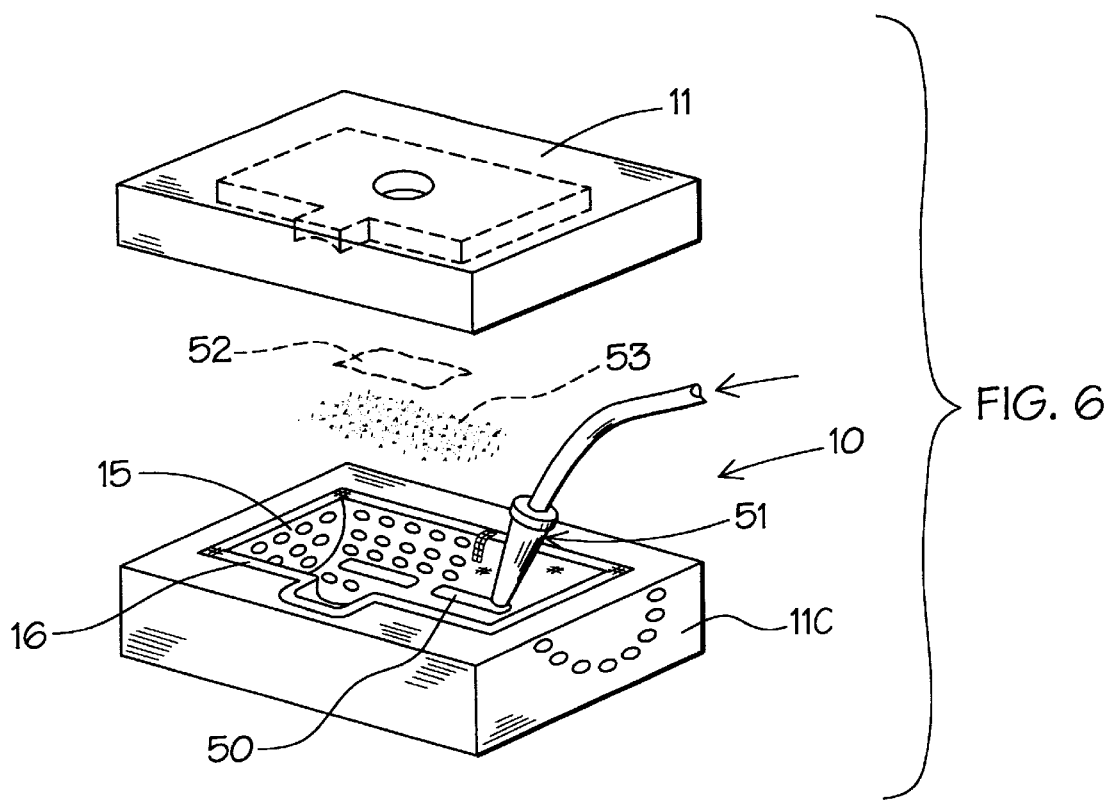
FIG. 6 is an exploded perspective view of an open mold with fixed mesh lining and separable flexible porous screen with mold texturing thereon and areas of thermal texturing material deposited thereover.

Referring now to FIG. 6 of the drawings, the mold assembly 10 can be seen with the metal mesh 15 and metallic mesh 16 positioned within the base body member 11. A thermal texturing paste material 50 is deposited within the assembled mold base 11C by a hose and nozzle assembly 51 which is connected to a storage source of the thermal texturing paste material 50, not shown. The thermal texturing paste material 50 is preferably composed of a mixture of thermal ceramic materials commercially available in this example as Superwool no. 607®, in bulk form. The fibers are non-combustible with a stable reactivity and are made up of silica ($SiO_2$) 65% by weight, calicium oxide (CaO) 29% by weight, magnesium oxide (MgO) 5% by weight in inert material, 1 percent by weight. Vermiculite is added to the mix along with colloidal silica and water as a binder.

® Registered Trademark of Thermal Ceramics, Inc.

It will be apparent to those skilled in the art that other ceramic wool materials can be substituted for the Superwool 607®, such as mineral wool and refractory ceramics such as Fiber Fax brand. Due to the thermal properties of the thermal texturing paste material 50, it will impart a "glow" to the selected areas of the log replicating charred wood surfaces.

Alternately, a blanket 52 of Superwool 607®, can be used in a method which entails first distributing of vermiculite 53 and the binder shown in dotted lines in FIG. 6 of the drawings, within the mold base 11C on the textured metallic mesh 16 in chosen areas. Sections of Superwool 607® in blanket form are then cut and then placed over the vermiculited areas.

In either applications, the mold 11 is closed and injection control valve 31 opens imparting the batch injection tank content slurry under a positive pressure range of 10–20 psi into the mold assembly 10 via a supply line 31A as best seen in FIG. 3 of the drawings, filling the mold cavity within. The injection control valve 31 is then closed and a drying control valve 32 is opened to a second source of compressed air 33. Air pressure supply to the mold assembly 10 in the range of 35 to 40 psi forces the liquid L out through the drain openings 25 within the mold base 23.

The water is driven out of the mold assembly 10 leaving the ceramic fibers collected on the molding surface 17 of the synthetic mesh 16 within. The water is captured within the retainment enclosure 20 collected and returned to a recycled water storage tank 34. After an express drying cycle of approximately three minutes, the retainment enclosure 20 is open and the log is retrieved from the mold assembly 10 having a highly reduced total moisture content in the range of approximately 30%.

The coalesce log L is transferred to an initial drawing chamber 35 to complete the initial formation of the ceramic fiber log.

Figure 7:
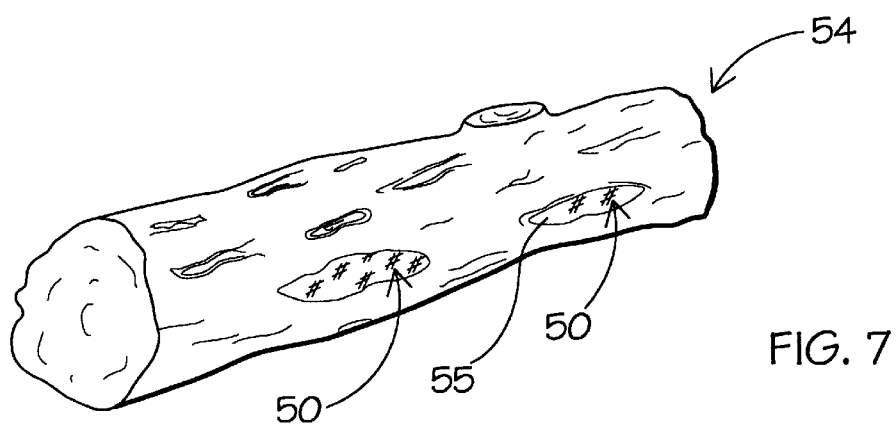
FIG. 7 is a perspective view of a coalesced synthetic fiber log with areas of enhanced thermal texturing molded within.

Referring now to FIG. 7 of the drawings, a coalesced log 54 of the invention can be seen having areas of impinged textured thermal paste material 50 imparting an enhanced surface treatment areas at 55. As hereinbefore described, the enhanced thermal surface texturing areas 55 will have a different thermal absorption rate that will impart a realistic emberized effect to the log during use and exposure to combustion gases.

Figure 5:
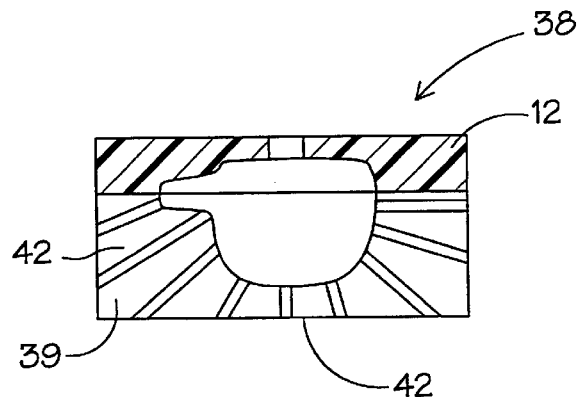
FIG. 5 is a cross-sectional view of an alternate mold base having a plurality of liquid clear apertures therein.

Referring now to FIG. 5 of the drawings, an alternate mold assembly 38 is disclosed wherein an alternate mold base 39 can be seen having a plurality of liquid dispersion apertures 40 extending from an inner surface 41 to the outer exterior surface 42 of the mold base 39. The alternate mold assembly 38 is used within the hereinbefore described retainment enclosure 20 and is injected with the mold slurry MS in the same manner as that of the previous mold assembly 10 described above.

It will thus be seen that an improved process for molding synthetic logs for use in gas fireplaces wherein the logs L and 51 have an initial lower moisture content by use of the pressure injection and drawing sequences which reduces the primary oven drying cycle. Additionally, it will be seen that by use of the pressure collation and primary drying steps a much finer texture detail is imparted to the finished log surfaces than hereinbefore has been possible with traditional dip vacuum molding process.

It will be apparent to those skilled in the art that various changes and modifications may be made therein without departing from the spirit of the invention.

Therefore I claim:

1. The method of molding a three-dimensional synthetic ceramic fiber log having areas of enhanced thermal surface treatment that can be used in gas fired fireplaces, the process comprises the steps of
   a. fitting a mold screen within a support mold, said support mold having a base portion and a top portion with a mold cavity therebetween,
   b. depositing a thermal texturing paste over portions of said mold screen,
   c. closing said support mold and introducing a ceramic fiber slurry under pressure within said mold cavity,
   d. coalescing said ceramic fibers on the mold screen and thermal texturing paste portions within said support mold by injection of air pressure,
   e. express drying said coalesced fibers by forcing excess liquid out of the mold cavity by air pressure,
   f. capturing and recovering said excess liquid from said mold within a retainment enclosure,
   g. removing said coalesce fibers in the form of an artificial fireplace log from said mold and drying said ceramic log at an elevated temperature during a second drying step.

2. The method set forth in claim 1 wherein said mold screen has a textured surface therein.

3. The method set forth in claim 1 wherein said support mold base and top have a plurality of elongated aligned grooves within.

4. The method set forth in claim 1 wherein said support mold base further has a first diversion screen conformed within.

5. The method set forth in claim 1 wherein said steps of depositing the thermal texturing paste on the mold screen employs, a nozzle and hose assembly connected to a source of thermal texturing material under pressure.

6. The method set forth in claim 1 wherein said step of introducing the ceramic fiber slurry under pressure employs a batch injection tank, a source of air pressure communication with said tank and valving means interconnecting same.

7. The method set forth in claim 1 wherein said step of coalescing said ceramic fibers into a log employs air pressure in the range of between 10 and 15 psi.

8. The method set forth in claim 1 wherein said step of excess express drying said coalesced fiber within said mold employs air pressure in the range of 35–40 psi.

9. The method set forth in claim 1 wherein the step of capturing and recovering said excess liquid from said mold within the retainment enclosure further employs a plurality of drain openings in said retainment enclosure interconnected with a recovery tank.

10. The method set forth in claim 3 wherein said elongated aligned grooves are in communication with the exterior of said mold base and top.

11. The method set forth in claim 1 wherein said support mold base and top further have a plurality of apertures within extending through apertures in said base and top.

12. The method of molding a three-dimensional synthetic ceramic fiber log having areas of increased thermal surface treatments that can be used in gas fired fireplaces, the process comprises the steps of
   a. fitting a mold screen within a support mold, said support mold having a base portion and a top portion with a mold cavity therebetween,
   b. depositing vermiculite, a binder and a ceramic wool sheet on portions of said screen,
   c. closing said support mold and introducing a ceramic fiber slurry under pressure within said mold cavity,
   d. coalescing said ceramic fibers on the mold screen and the ceramic wool sheets and thermal texturing paste portions within said support mold by injection of air pressure,
   e. express drying said coalesced fibers by forcing excess liquid out of the mold cavity by air pressure,
   f. capturing and recovering said excess liquid from said mold within a retainment enclosure,
   g. removing said coalesced fibers in the form of an artificial fireplace log from said mold and drying said ceramic log at an elevated temperature during a second drying step.

13. The method set forth in claim 12 wherein said mold screen has a textured surface therein.

14. The method set forth in claim 12 wherein said artificial fireplace log has area of enhanced thermal texturing within that reacts to heat input at a rate greater than that of the surrounding surfaces.

15. The method set forth in claim 12 wherein said support mold base and top have a plurality of elongated aligned grooves within.

16. The method set forth in claim 12 wherein said step of introducing the ceramic fiber slurry under pressure a batch injection tank, a source of air pressure communication with said tank and valving interconnecting means.

17. The method set forth in claim 12 wherein said step of coalescing said ceramic fibers into a log employs air pressure in the range of between 10 and 15 psi.

18. The method set forth in claim 12 wherein said step of excess express drying said coalesced fiber within said mold employs air pressure in the range of 35–40 psi.

19. The method set forth in claim 12 wherein the step of capturing and recovering said excess liquid from said mold within the retainment enclosure further employs a plurality of drain openings in said retainment enclosure interconnected with a recovery tank.

* * * * *